C. B. PECK.
CURTAIN WINDOW.
APPLICATION FILED JULY 2, 1920.
1,380,245.
Patented May 31, 1921.
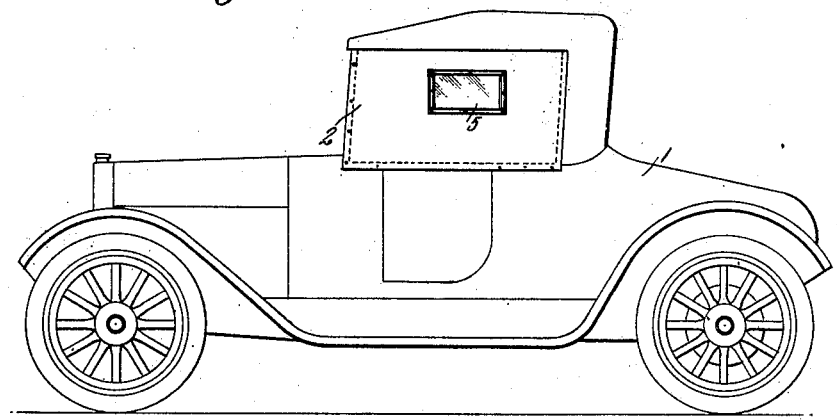
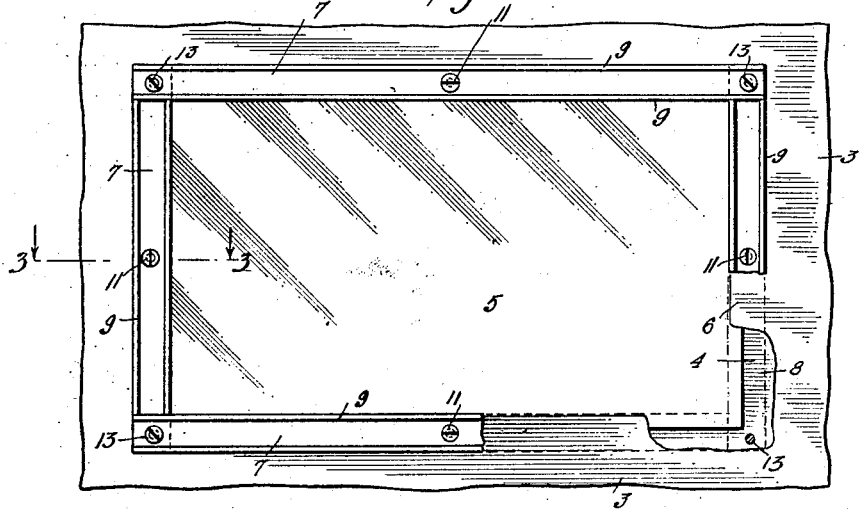
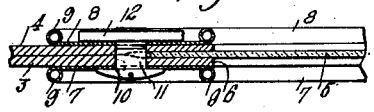
WITNESSES
Bernard Aebly
F. J. Foster
INVENTOR
Charles B. Peck
BY Munn & Co
ATTORNEYS

UNITED STATES PATENT OFFICE.

CHARLES B. PECK, OF BATAVIA, NEW YORK.

CURTAIN-WINDOW.

1,380,245.  Specification of Letters Patent.  Patented May 31, 1921.

Application filed July 2, 1920. Serial No. 393,592.

*To all whom it may concern:*

Be it known that I, CHARLES B. PECK, a citizen of the United States, and a resident of Batavia, in the county of Genesee and State of New York, have invented a new and Improved Curtain-Window, of which the following is a full, clear, and exact description.

This invention relates to improvements in curtain windows especially windows which are adapted for use in the side curtains and rear fabric coverings of automobiles, an object of the invention being to provide a detachable glass window which will take the place of the lights of celluloid and other flexible material now in general use on automobiles and similar vehicles.

A further object is to provide a glass window which may be inserted in any ordinary curtain or automobile top which will be light in weight and practical and durable in use and which may be readily replaced when broken.

The celluloid plates commonly employed in this connection are not only hard to keep clean but also difficult to repair when broken. My improved device overcomes both of these disadvantages.

With these and other objects in view the invention consists in certain novel features of construction and combinations or arrangements of parts as will be more fully hereinafter described and pointed out in the claim.

In the accompanying drawings—

Figure 1 is a view in elevation illustrating an automobile having my improved window in the side curtain thereof;

Fig. 2 is a broken plan view on an enlarged scale of the window showing the method of securing it in the curtain;

Fig. 3 is an enlarged sectional fragmentary view on the line 3—3 of Fig. 2.

1 represents an automobile with which the usual side curtains 2 are employed. It is customary to make the curtains 2 of two thicknesses or layers of fabric. For convenience we shall call these layers of fabric 3 and 4 respectively.

A sheet of glass 5 large enough to cover an opening 6 left in the curtain is positioned in the opening, the edges of the sheet 5 being located between the layers 3 and 4 of the curtain 2. Strips of metal 7 and 8 are located at the edges of the opening 6, the strips 7 being located against the layer 3 and the strips 8 positioned against the layer 4. The strips 7 and 8 are preferably of light metal and made with beaded edges 9 to strengthen the strips and to serve another purpose which will hereinafter appear.

Corresponding strips on opposite sides of the curtain are provided with alined perforations 10 to accommodate bolts 11 which coöperate with nuts 12 to secure the strips 7 and 8 together and clamp the edges of the layers 3 and 4 between the strips. The strips 7 and 8 when assembled form a pair of frames located on opposite sides of the curtain. Bolts 13 and nuts may be employed to join the ends of the strips together.

Bolts 11 and 13 do not pass through the glass 5 but pass through the fabric of the curtain adjacent the glass so that the glass is confined within the two frames between the edges of the layers 3 and 4 as shown clearly in Fig. 3.

The nuts 12 are preferably square in shape and are prevented from turning by the beads 9 on the edges of the strips 7 and 8 so that the headed ends of the bolts are turned to secure the frames together and the nuts 12 and 14 are secured against accidental displacement by the beads 9.

The usual method of securing the celluloid windows or lights in a curtain is to sew the edges of a celluloid sheet between the two layers of fabric. To insert my device in a curtain where celluloid is now being used, it is only necessary to rip out the stitches and secure a suitable piece of glass in the opening in the manner herein set forth.

Although I have illustrated a rectangular window, it is obvious that the window could be differently shaped and that various slight changes and alterations might be made in the general form of the parts described without departing from my invention and hence I do not limit myself to the precise details set forth, but consider myself at liberty to make such slight changes and alterations as fairly fall within the spirit and scope of the appended claim.

I claim:—

The combination with a flexible support having an opening therein and a sheet of glass in the opening, of a frame located on each side of the sheet, means connecting the frames to clamp the glass and the support between them, each frame comprising a plurality of independent flat straight strips of light thin metal removably joined together to form a rigid frame, each strip being provided with outwardly presented beaded edges, said connecting means comprise bolts and nuts, and said beaded edges preventing accidental turning of the nuts.

CHARLES B. PECK.